US007372710B2

(12) United States Patent
Kyono

(10) Patent No.: US 7,372,710 B2
(45) Date of Patent: *May 13, 2008

(54) SWITCHING POWER SOURCE DEVICE OF THE TYPE CAPABLE OF CONTROLLING POWER LOSS IN GENERATING OUTPUT VOLTAGE FROM A SECONDARY WINDING OF A TRANSFORMER

(75) Inventor: Yoichi Kyono, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 133 days.

This patent is subject to a terminal disclaimer.

(21) Appl. No.: 10/574,648

(22) PCT Filed: Jun. 28, 2004

(86) PCT No.: PCT/JP2004/009115

§ 371 (c)(1),
(2), (4) Date: Mar. 29, 2006

(87) PCT Pub. No.: WO2005/034325

PCT Pub. Date: Apr. 14, 2005

(65) Prior Publication Data

US 2007/0070657 A1    Mar. 29, 2007

(30) Foreign Application Priority Data

Sep. 30, 2003    (JP)    ............................. 2003-341294

(51) Int. Cl.
*H02M 7/217*    (2006.01)
(52) U.S. Cl. ..................... 363/21.14; 363/89; 363/127
(58) Field of Classification Search ............. 363/21.06, 363/21.14, 89, 127
See application file for complete search history.

(56) References Cited

U.S. PATENT DOCUMENTS

| 6,791,849 | B2* | 9/2004 | Nakayama | ............... | 363/21.14 |
| 7,212,416 | B2* | 5/2007 | Kyono | ................... | 363/21.14 |
| 2003/0193820 | A1* | 10/2003 | Nakayama | ............... | 363/21.14 |

FOREIGN PATENT DOCUMENTS

| JP | 7-245943 | 9/1995 |
| JP | 8-317639 | 11/1996 |
| JP | 9-215325 | 8/1997 |
| JP | 9-312972 | 12/1997 |

* cited by examiner

*Primary Examiner*—Jeffrey Sterrett
(74) *Attorney, Agent, or Firm*—Bachman & LaPointe, P.C.

(57) ABSTRACT

A switching power source device is provided which comprises a secondary MOS-FET 9 connected between a secondary winding 6 of a transformer 2, a reactor 11 connected in parallel to secondary winding 6 of transformer 2 for accumulating energy during the on-period of primary MOS-FET 4, and a secondary control circuit 12 connected to reactor 11 and a control terminal of secondary MOS-FET 9. Secondary control circuit 12 serves to turn secondary MOS-FET 9 off to accumulate energy in reactor 11, turn secondary MOS-FET 9 on to discharge energy accumulated in reactor 11, and turn secondary MOS-FET 9 off upon completion of energy release from reactor 11. As secondary control circuit 12 turns secondary MOS-FET 9 on and off in response to the periods for accumulating and discharging energy in reactor 11, the device can perform the efficient synchronous rectification operation of secondary MOS-FET 9 even under the fluctuating condition of input and output voltages E, $V_O$ and control of power loss in output voltage $V_O$ produced from secondary winding 6 of transformer 2.

6 Claims, 6 Drawing Sheets

SWITCHING POWER SOURCE DEVICE OF THE TYPE CAPABLE OF CONTROLLING POWER LOSS IN GENERATING OUTPUT VOLTAGE FROM A SECONDARY WINDING OF A TRANSFORMER

TECHNICAL FIELD

This invention relates to a switching power source device, in particular, of the type capable of controlling power loss for output voltage generated from a secondary winding of a transformer.

BACKGROUND OF THE INVENTION

A known switching power source device comprises a primary winding of a transformer and a switching element connected in series to a DC power source wherein switching element is turned on and off to cause electric current to flow through primary winding and switching element in order to generate DC power from output terminals connected to a secondary winding of transformer. When switching element is turned on, electric current passes through primary winding of transformer to accumulate electro-magnetic energy in transformer, and when switching element is turned off, stored electro-magnetic energy can be taken out from secondary winding in a switching power source device named "Flyback Converter". However, the converter has a drawback of lowered efficiency in power conversion because a rectifying diode connected to secondary winding of transformer incurs power loss due to voltage drop in the forward direction upon the conduction of the diode.

Then, to reduce power loss resulted from voltage drop in the forward direction of the diode connected to secondary winding, a switching power source device has been proposed in the following Patent Document 1 wherein a power MOS-FET as a switching element in a synchronous rectification circuit is connected to secondary winding to prevent passage of adverse current and reduce voltage drop in the forward direction, thereby mitigating operational burden of transformer. This switching power source comprises a pulse transformer which includes a main converter circuit such as a flyback or forward converter circuit; a power MOS-FET of synchronous rectification connected to a secondary winding of pulse transformer for rectifying output current from secondary winding; and a guard comparator for monitoring change in direction of electric current flowing between source and drain terminals of power MOS-FET of synchronous rectification to control the forward and backward currents by a gate drive signal supplied from guard comparator to a gate terminal of power MOS-FET of synchronous rectification.

Patent Document 1: Japanese Patent Disclosure No. 7-7928 (Page 6, FIG. 1)

DISCLOSURE OF THE INVENTION

Problems to be Solved by the Invention

Now, various kinds of synchronous rectifiers have been proposed to provide drive signals for switching element of synchronous rectification in switching power source devices. For example, there are kinds of detecting a voltage at a terminal of such a switching element as shown with the above-mentioned switching power source device, detecting a voltage in a secondary side of transformer or detecting electric current flowing through such a switching element. The synchronous rectifier of the type for detecting a voltage at terminal of switching element or for detecting voltage in secondary side of transformer has a defect of incurring power loss in a secondary synchronous rectifying circuit of transformer due to deviation in phase between secondary current and voltage which would provide a reactive component in output power. The synchronous rectifier of the type for detecting electric current flowing through switching element is also disadvantageous in that it involves a power-consumptive current detector such as current detecting resistor or current transformer in a synchronous rectifying circuit connected to secondary winding so that current detector invokes power loss.

Accordingly, an object of the present invention is to provide a switching power source device capable of controlling power loss in output voltage taken from a secondary winding of a transformer.

Means for Solving the Problems

The switching power source device according to the present invention, comprises a primary winding (3) of a transformer (2) and a primary switching element (4) connected in series to a DC power source (1) wherein primary switching element (4) is turned on and off to cause electric current to flow through primary winding (3) and primary switching element (4) in order to generate DC power from output terminals (7, 8) connected to a secondary winding (6) of transformer (2). This switching power source device also comprises a secondary switching element (9) for synchronous rectification connected between secondary winding (6) of transformer (2) and output terminals (7, 8), a reactor or choke coil (11) connected in parallel to secondary winding (6) of transformer (2) for accumulating energy during the on-period of primary switching element (4), and a secondary control circuit (12) connected to reactor (11) and a control terminal of secondary switching element (9). Secondary control circuit (12) serves to retain secondary switching element (9) off during the period for accumulating energy in reactor (11), retain secondary switching element (9) on during the period for discharging energy accumulated in reactor (11), and turn secondary switching element (9) off upon completion of energy release from reactor (11).

In this switching power source device, secondary switching element (9) is turned on and off by secondary control circuit (12) in response to the periods for accumulating and discharging energy in reactor (11) to perform the efficient synchronous rectification operation of secondary switching element (9) under the fluctuating condition of input and output voltages (E, $V_O$). This ensures that the device can produce output voltage ($V_O$) from secondary winding (6) of transformer (2) under control of power loss in output voltage ($V_O$) over wide input and output range. Moreover, an entire energy accumulated in reactor (11) can be transmitted to the output side through secondary switching element (9) of less power loss to minimize power loss in a synchronous rectification circuit.

Effect of the Invention

According to the present invention, a secondary switching element can be turned on and off in response to the periods for accumulating and discharging energy in reactor connected to a secondary winding of a transformer to perform the efficient synchronous rectification operation of secondary switching element under control of power loss in output voltage over wide input and output range although input and output voltages fluctuate. In addition, an entire energy accumulated in reactor can be transmitted to the output side to minimize power loss in secondary control circuit.

Explanation of Symbols

1 . . . A DC power source, 2 . . . A transformer, 3 . . . A primary winding, 4 . . . A primary MOS-FET (A primary switching element), 5 . . . A primary control circuit, 6 . . . A secondary winding, 7, 8 . . . Output terminals, 9 . . . A secondary MOS-FET for synchronous rectification (A secondary switching element for synchronous rectification), 10 . . . An output smoothing capacitor, 11 . . . A reactor, 12 . . . A secondary control circuit for synchronous rectification, 13 . . . A switch circuit, 14 . . . A reset detector, 15 . . . A first diode (A rectifying element), 16 . . . A first inverter (A first reset voltage detector), 17 . . . A second diode (A reset voltage detector), 18 . . . A third diode, 19, 20 . . . Dividing resistors, 21 . . . A NOR gate (A switch controller), 22 . . . A capacitor, 23 . . . A second inverter, 24 . . . A fourth diode, 25 . . . A resistor, 26 . . . A retaining circuit, 30 . . . A third winding, 31 . . . A first NPN transistor (A reactor current detector), 32, 38 . . . resistors, 33, 35, 36 . . . diodes, 34 . . . A PNP transistor, 37 . . . A second NPN transistor, 40 . . . An exclusive OR gate (A secondary control circuit for synchronous rectification), 40a . . . A first input terminal, 40b . . . A second input terminal, 40c . . . An output terminal, 41, 42 . . . First level shift resistors, 43, 44 . . . Second level shift resistors, 45 . . . A first clamp diode, 46 . . . A second clamp diode, 50 . . . An AND gate, 50a . . . A first input terminal, 50b . . . A second input terminal, 50c . . . An output terminal, 51 . . . An inverter, 52 . . . A first NAND gate, 53 . . . A second NAND gate, 54 . . . A third NAND gate, 60 . . . A drive NPN transistor, 61 . . . A drive MOS-FET, 62 . . . A first resistor, 63 . . . A NOR gate, 65 . . . A second resistor.

BEST MODE FOR CARRYING OUT THE INVENTION

Six embodiments of the switching power source device according to the present invention are described hereinafter with reference to FIGS. 1 to 12 of the drawings.

First Embodiment

Figure 1:
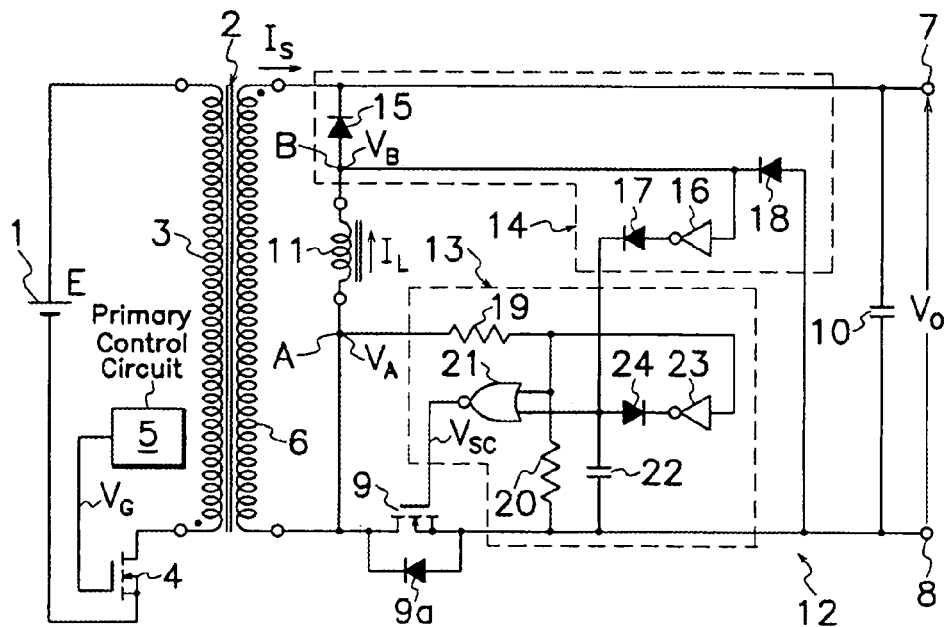
[FIG. 1] An electric circuit diagram showing a first embodiment of the switching power source according to the present invention (A First Embodiment)
Figure 2:
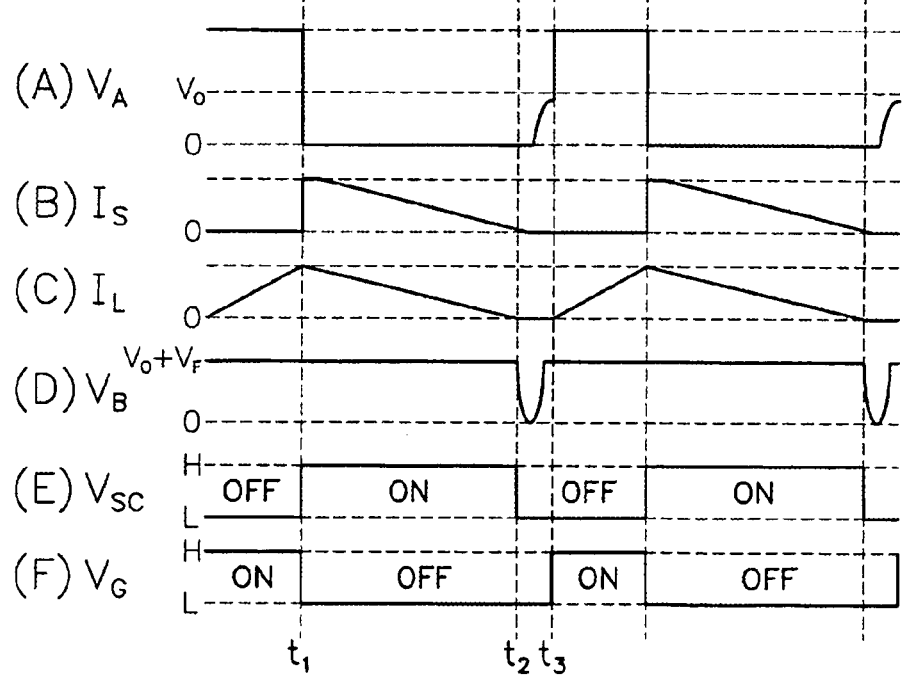
[FIG. 2] A timing chart showing waveforms of electric current and voltages at selected locations in the circuit shown in FIG. 1.

FIG. 1 illustrates a first embodiment of the switching power source device according to the present invention. The device comprises a primary winding 3 of a transformer 2 and a primary MOS-FET 4 as a primary switching element connected in series to a DC power source 1; a primary control circuit 5 for controlling to turn primary MOS-FET 4 on and off; a secondary MOS-FET 9 as a secondary switching element for synchronous rectification and an output smoothing capacitor 10 connected between a secondary winding 6 of transformer 2 and output terminals 7, 8; a reactor or choke coil 11 connected in parallel to secondary winding 6 of transformer 2 for accumulating energy during the on-period of primary switching element 4, and a secondary control circuit 12 for synchronous rectification connected to reactor 11 and a control terminal of secondary MOS-FET 9. Secondary control circuit 12 serves to retain secondary MOS-FET 9 off during the period for accumulating energy in reactor 11, retain secondary MOS-FET 9 on during the period for discharging energy accumulated in reactor 11, and turn secondary MOS-FET 9 off upon completion of energy release from reactor 11. Secondary MOS-FET 9 has a parasitic diode 9a connected between drain and source terminals thereof.

Secondary control circuit 12 comprises a switch circuit 13 and a reset detecting circuit 14 for controlling switch circuit 13. Switch circuit 13 comprises dividing resistors 19 and 20 connected between the other (bottom) end of reactor 11 and negative output terminal 8, and a NOR gate 21 as a switch controller which has a first input terminal connected to a junction of dividing resistors 19 and 20 for detecting an accumulative period for accumulating energy in reactor 11 based on voltage produced on junction of dividing resistors 19 and 20, a second input terminal connected to reset detecting circuit 14, and an output terminal connected to a gate terminal of secondary MOS-FET 9. Also, a capacitor 22 is connected between second input terminal of NOR gate 21 and negative output terminal 8, and a series circuit of a second inverter 23 and a fourth diode 24 is connected between second input terminal of NOR gate 21 and junction of dividing resistors 19 and 20.

Reset detecting circuit 14 comprises a first diode 15 as a rectification element connected between one end (a marked black dot) of secondary winding 6 of transformer 2 and one (top) end of reactor 11, a first inverter 16 as a reset voltage detector connected to first diode 15, a second diode 17 connected in series between first inverter 16 and capacitor 22, and a third diode 18 connected between junction of first diode 15 and first inverter 16 and negative output terminal 8. First inverter 16 detects drop in reset voltage $V_B$ on junction B between reactor 11 and first diode 15 upon completion of energy release from reactor 11 to convert switch circuit 13 to shift mode. Third diode 18 clamps minimum level of reset voltage $V_B$ to zero volt upon drop in reset voltage $V_B$.

In operation, primary control circuit 5 produces drive signals $V_G$ of high voltage level shown in FIG. 2(F) to gate terminal of primary MOS-FET 4 to turn primary MOS-FET 4 on so that winding current flows from DC power source 1 through primary winding 3 of transformer 2 and primary MOS-FET 4 to store energy in transformer 2. Here, assuming that E [V] denotes voltage of DC power source 1, and $L_P$ [H] is inductance of primary winding 3 of transformer 2, accumulated in transformer 2 during the on-period $t_{ON}$ of primary MOS-FET 4 is energy expressed by the following:

$$(E^2/2L_P) \times t_{ON}^2 \qquad [J]$$

At this time, no current $I_S$ flows through secondary winding 6 of transformer 2 as shown in FIG. 2(B). Assuming that $N_P$ and $N_S$ indicate respectively number of turns in primary and secondary windings 3 and 6 of transformer 2, produced in secondary winding 6 whose top end (marked black dot) is negative (−) and bottom end is positive (+) is voltage $V_S$ expressed by the following:

$$V_S = (N_S/N_P) \times E \qquad [V]$$

At this time, voltage $V_A$ shown in FIG. 2(A) at junction A between reactor 11 and dividing resistor 19 is substantially equal to voltage $V_S$ produced in secondary winding 6 of transformer 2; voltage $V_B$ shown in FIG. 2(D) at junction B between reactor 11 and first diode 15 is substantially equal to a sum $(V_O+V_F)$ of DC output voltage $V_O$ between output terminals 7 and 8 and forward voltage drop $V_F$ of first diode 15; and therefore, electric current $I_L$ flows into reactor 11 through first diode 15. Here, if L [H] is inductance of reactor 11, electric current $I_L$ through reactor 11 increases in a linear function fashion at a rate of $V_S/L$ per second as shown in FIG. 2(C), and during the on-period $t_{ON}$ [s] of primary MOS-FET 4, accumulated in reactor 11 is energy shown by the following:

$$(V_S^2/2L) \times t_{ON}^2 \qquad [J]$$

On the other hand, produced by secondary winding 6 is voltage $V_S$:

$$V_S = (N_S/N_P) \times E \qquad [V]$$

With DC output voltage $V_O$ between output terminals 7 and 8, generated between drain and source terminals of secondary MOS-FET 9 is a sum voltage shown by the following:

$$V_S + V_O$$

This sum voltage $(V_S+V_O)$ is split by dividing resistors 19 and 20 in switch circuit 13 which constitutes secondary control circuit 12 for synchronous rectification to apply voltage at junction of dividing resistors 19 and 20 to first input terminal of NOR gate 21. Each resistance value of dividing resistors 19 and 20 is determined to set divided voltage at junction of dividing resistors 19 and 20 such that divided voltage exceeds a threshold voltage of NOR gate 21 when primary MOS-FET 4 is turned on, but does not exceed threshold voltage of NOR gate 21 upon ringing which may occurs during the light load period or in a similar case to prevent malfunction of secondary MOS-FET 9 by such ringing. Accordingly, as divided voltage of resistors 19 and 20 comes to high voltage level when primary MOS-FET 4 is turned on, NOR gate 21 produces the output $V_{SC}$ of low voltage level to gate terminal of secondary MOS-FET 9 as shown in FIG. 2(E) to maintain switch circuit 13 in inactive mode, and secondary MOS-FET 9 is kept off. At this time, divided voltage of high voltage level between resistors 19 and 20 is also applied to second inverter 23 which produces the output of low voltage level to discharge capacitor 22 to a low voltage level. At the same time, the sum voltage $V_S+V_O$ keeps high voltage level at junction B and at input terminal of first inverter 16 in reset detecting circuit 14 so that first inverter 16 produces the output of low voltage level to maintain capacitor 22 on low voltage level.

When time is up to point $t_1$, primary control circuit 5 changes the output from high to low voltage level to gate terminal of primary MOS-FET 4 to switch primary MOS-FET 4 from on to off so that voltage polarity changes to positive (+) top end (marked black dot) and negative (−) bottom end in secondary winding 6 of transformer 2 to produce voltage $V_S$ shown in the given formula:

$$V_S = (N_S/N_P) \times E \qquad [V]$$

At this point, junction A of reactor 11 and dividing resistor 19 drops to nearly zero volt voltage as shown in FIG. 2(A) so that junction of dividing resistors 19 and 20 also decreases to low level voltage to apply low level voltage to first input terminal of NOR gate 21. Meanwhile, second inverter 23 produces the output of high voltage level which however is barred by fourth diode 24 to keep capacitor 22 and second input terminal of NOR gate 21 at the low voltage level. Accordingly, NOR gate 21 changes the output from low to high voltage level to gate terminal of secondary MOS-FET 9 which is turned on that means turnover of switch circuit 13 from inactive to active mode.

During the on-period of primary MOS-FET 4, winding current through primary winding 3 stores energy in transformer 2. When secondary MOS-FET 9 is turned on at point $t_1$, stored in transformer 2 is energy shown by:

$$(E^2/2L_P) \times t_{ON}^2 \qquad [J]$$

causes electric current $I_S$ from secondary winding 6 of transformer 2 to output terminals 7 and 8 releasing stored energy. As electric current $I_S$ through secondary winding 6 decreases in a linear function fashion or rectilinearly at a rate of $V_O/L_S$ per second during the on-period of secondary MOS-FET 9, assuming that $L_S$ [H] is inductance of secondary winding 6 of transformer 2, stored energy in transformer 2 is reduced through secondary winding 6 with the ramp:

$$(V_O^2/2L_S) \times t^2$$

There is the following relation among inductances $L_P$ and $L_S$ [H] and numbers of turns $N_P$ and $N_S$ of primary and secondary windings 3 and 6 of transformer 2:

$$L_S = (N_S/N_P)^2 \times L_P$$

Therefore, discharge time $t_T$ for releasing energy accumulated in transformer 2 is shown by:

$$t_T = (N_S \cdot E/N_P \cdot V_O) \times t_{ON} \qquad [s]$$

Simultaneously, accumulated in reactor 11 during the on-period $t_{ON}$ [s] of primary MOS-FET 4 is energy expressed by:

$$(V_S^2/2L) \times t_{ON}^2 \qquad [J]$$

which is discharged by electric current $I_L$ flowing from reactor 11 through first diode 15 while electric current $I_L$ decreases at a rate $V_O/L$ per second in a linear function fashion or rectilinearly as shown in FIG. 2(C). During the on-period of secondary MOS-FET 9, energy in reactor 11 is reduced with the ramp:

$$(V_O^2/2L) \times t^2$$

Therefore, discharge time $t_L$ for releasing energy from reactor 11 is shown by the formula:

$$t_L = (N_S \cdot E/N_P \cdot V_O) \times t_{ON} \quad [s]$$

The discharge time $t_L$ is essentially equal to discharge time $t_T$ for releasing energy in transformer 2.

When release of energy in reactor 11 is completed at point $t_2$ while electric current $I_L$ through reactor 11 is diminished to a substantially zero as shown in FIG. 2(C), reset voltage $V_B$ between reactor 11 and first diode 15 rapidly drops from $(V_O+V_F [V])$ to zero volt as shown in FIG. 2(D) to apply low level voltage to first inverter 16 in reset detecting circuit 14. For that reason, first inverter 16 produces the output of high voltage level to capacitor 22 through second diode 17 to charge capacitor 22 and therefore apply high voltage level to second input terminal of NOR gate 21 in switch circuit 13. Since junction A of reactor 11 and dividing resistor 19 is kept on zero volt voltage $V_A$ as shown in FIG. 2(A), divided voltage between resistors 19 and 20 is retained at low level to apply low level voltage to first input terminal of NOR gate 21. Consequently, NOR gate 21 switches synchronous rectification signal $V_{SC}$ from high to low voltage level to gate terminal of secondary MOS-FET 9 to turn switch circuit 13 from active to inactive mode. This causes secondary MOS-FET 9 to change from on to off to finish the synchronous rectification operation. In this case, low level voltage on junction between dividing resistors 19 and 20 is also applied to second inverter 23 which produces the output of high voltage level blocked by fourth diode 24 to maintain capacitor 22 at the high voltage level until time $t_3$ for again turning primary MOS-FET 4 on. As primary MOS-FET 4 still remains off during the period between points $t_2$ and $t_3$ as shown in FIG. 2(F), oscillation voltage by ringing appears on junction A of reactor 11 and dividing resistor 19 as shown in FIG. 2(A).

Actually, as reset voltage $V_B$ on junction B of reactor 11 and first diode 15 falls as shown in FIG. 2(D) with resonance cycle by inductance of reactor 11 and parasitic capacitance by third diode 18 and the like after completion of energy release from reactor 11 at point $t_2$, the time that input terminal of first inverter 16 in reset detecting circuit 14 is lowered to low voltage level, may be late after the time that energy release in transformer 2 is completed. In this case, a resistor is connected in series to reactor 11 to more raise voltage in reactor 11 and reduce an amount of discharge current from reactor 11 in order to shorten the time for completing energy release from reactor 11 for synchronous rectification without regenerating energy to primary winding 3 of transformer 2.

In the first embodiment, switch circuit 13 is switched to three modes, namely an inactive mode for keeping secondary MOS-FET 9 off to accumulate energy in reactor 11 during the on-period of primary MOS-FET 4; an active mode for turning secondary MOS-FET 9 on to release energy stored in reactor 11 during the off-period of primary MOS-FET 4; and a shift mode for turning secondary MOS-FET 9 off when energy release from reactor 11 is completed. Also, reset detecting circuit 14 picks out resetting of reactor 11 when energy release from reactor 11 is completed to convert switch circuit 13 to shift mode to turn secondary MOS-FET 9 off. This ensures that reset detecting circuit 14 converts switch circuit 13 to shift mode to switch secondary MOS-FET 9 off upon completion of energy release from reactor 11.

Thus, the first embodiment can control the on-off operation of secondary MOS-FET 9 in response to the accumulation and release periods of energy in reactor 11 connected to secondary winding 6 of transformer 2 to automatically adjust the period of the synchronous rectification operation for efficient synchronous rectification operation even though there occurs fluctuation in original voltage E in DC power source 1 and DC output voltage $V_O$ between output terminals 7 and 8. Accordingly, secondary winding 6 of transformer 2 can produce DC output voltage $V_O$ through secondary MOS-FET 9 and output smoothing capacitor 10 with less power loss. Also, an entire energy accumulated in reactor 11 can be transmitted to output terminals 7 and 8 to minimize power loss in secondary control circuit 12.

Second Embodiment

Figure 3:
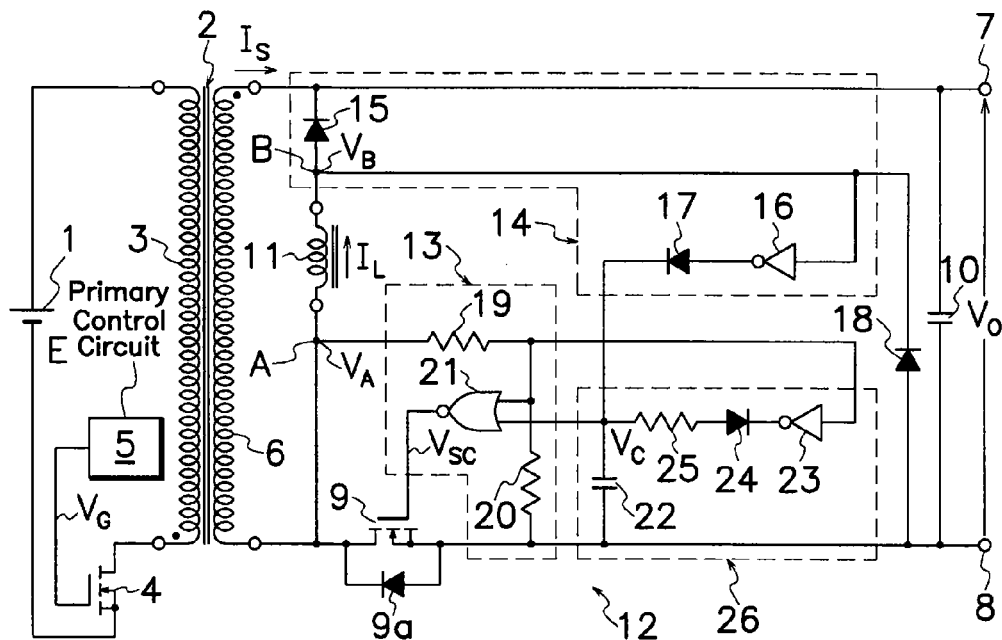
[FIG. 3] An electric circuit diagram showing a varied embodiment of FIG. 1 (A Second Embodiment)
Figure 4:
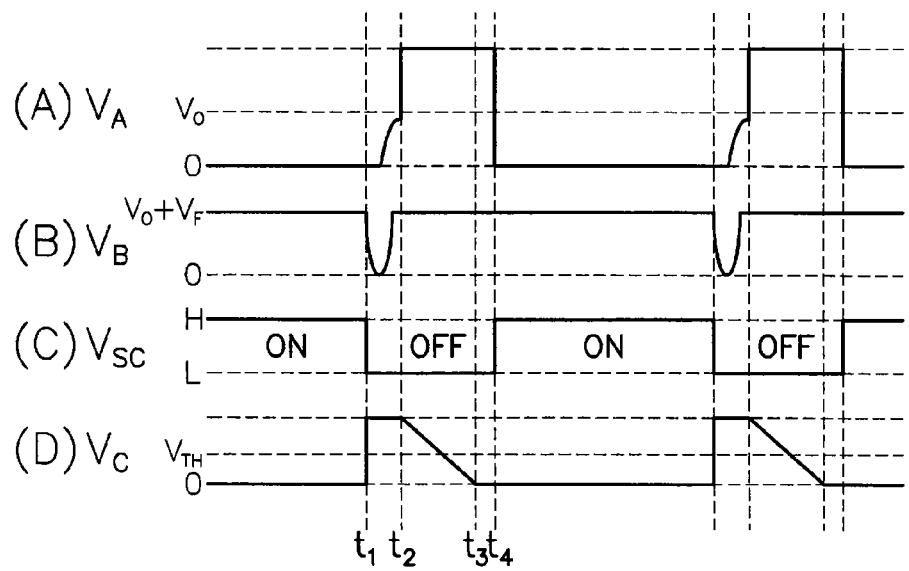
[FIG. 4] A timing chart showing waveforms of electric current and voltages at selected locations in the circuit shown in FIG. 3 during the rated load period.
Figure 5:
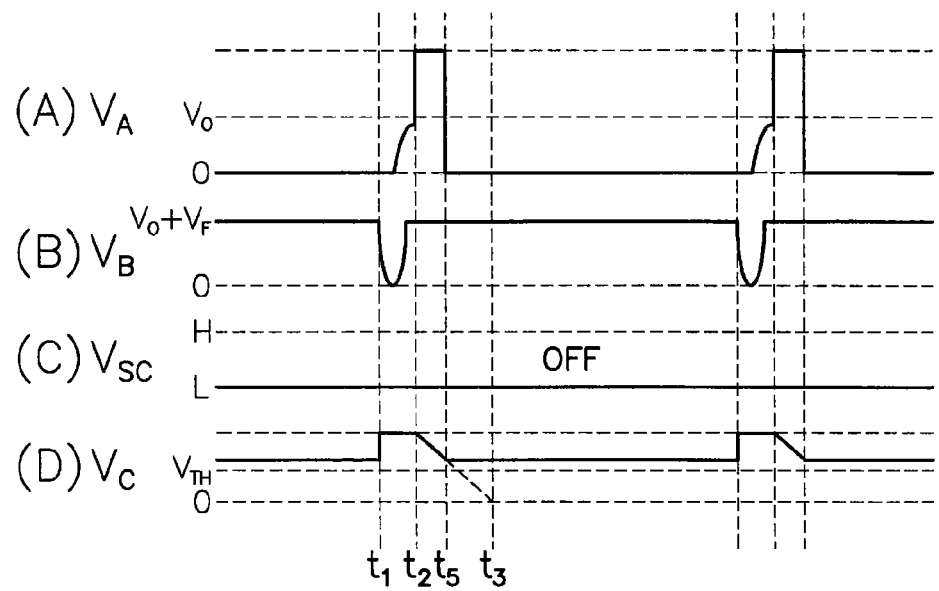
[FIG. 5] A timing chart showing waveforms of electric current and voltages at selected locations in the circuit shown in FIG. 3 during the light load period.

The first embodiment can be modified. By way of example, FIG. 3 illustrates a variation of the first embodiment as a second embodiment which comprises a resistor 25 connected between a junction of capacitor 22 and second diode 17 and fourth diode 24; and a retaining circuit 26 composed of capacitor 22, second inverter 23, fourth diode 24 and resistor 25. Retaining circuit 26 maintains second input terminal of NOR gate 21 at high voltage level to hold switch circuit 13 in inactive mode when voltage $V_A$ of narrow pulse width is applied on junction A of reactor 11 and dividing resistor 19. Other components are substantially similar to those in switching power source device of first embodiment shown in FIG. 1.

When a rated load not shown is connected to output terminals 7 and 8 in second embodiment shown in FIG. 3, energy release in reactor 11 is completed during the off-period of primary MOS-FET 4, and reset voltage $V_B$ on junction B falls from $(V_O+V_F [V])$ to nearly zero volt with resonance cycle by inductance of reactor 11 and parasitic capacitance of third diode 18 at point $t_1$ as shown in FIG. 4(B). At this time, low level voltage is applied to first inverter 16 in reset detecting circuit 14 to charge capacitor 22 by electric current flowing through output terminal of first inverter 16 at high voltage level through second diode 17. Thus, capacitor 22 is charged from zero volt to high voltage level as shown in FIG. 4(D) to apply high level voltage to second input terminal of NOR gate 21 in switch circuit 13. At the same time, as voltage $V_A$ at junction A of reactor 11 and dividing resistor 19 is zero volt as shown in FIG. 4(A), divided voltage between dividing resistors 19 and 20 in switch circuit 13 is kept at low voltage level to apply low level voltage to first input terminal of NOR gate 21. Therefore, NOR gate 21 changes synchronous control signal $V_{SC}$ from high to low voltage level to gate terminal of secondary MOS-FET 9 to automatically convert secondary MOS-FET 9 from on to off. Here, low level voltage at junction of dividing resistors 19 and 20 is also exerted on second inverter 23 in retaining circuit 26 to produce the output of high voltage level from second inverter 23, however, the output from second inverter 23 is blocked by fourth diode 24 so that capacitor 22 is maintained at high voltage level until the time $t_2$ that primary MOS-FET 4 is turned on. As primary MOS-FET 4 still remains off during the period between points $t_1$ and $t_2$, oscillation voltage by ringing appears on junction A of reactor 11 and dividing resistor 19 as shown in FIG. 4(A).

When primary MOS-FET 4 is turned from off to on at point $t_2$, voltage $V_A$ at junction A of reactor 11 and dividing resistor 19 becomes equal to voltage $V_S$ produced in secondary winding 6 of transformer 2 as shown in FIG. 4(A) and by the following equation:

$$V_S = (N_S/N_P) \times E \quad [V]$$

In addition, reset voltage $V_B$ at junction B of reactor 11 and first diode 15 is substantially equal to a sum $(V_O+V_F)$ of DC output voltage $V_O$ between output terminals 7 and 8 and forward voltage drop $V_F$ of first diode 15 as shown in FIG. 4(B). On the other hand, also applied between drain and source terminals of secondary MOS-FET 9 is a sum voltage $(V_S+V_O)$ of voltage $V_S$ induced on secondary winding 6 and DC output voltage $V_O$ between output terminals 7 and 8. Sum voltage $(V_S+V_O)$ is split by dividing resistors 19 and 20 to apply divided voltage at junction of resistors 19 and 20 to first input terminal of NOR gate 21. Thus, high level voltage at junction of resistors 19 and 20 causes NOR gate 21 to produce synchronous control signal $V_{SC}$ of low voltage level to gate terminal of secondary MOS-FET 21 as shown in FIG. 4(C) to retain secondary MOS-FET 9 off. High level voltage at junction of resistors 19 and 20 is also applied to second inverter 23 which produces the output of low voltage level to discharge capacitor 22 by discharge current flowing from capacitor 22 through resistor 25 and fourth diode 24 to second inverter 23 with the time constant determined by a product of capacitance of capacitor 22 and resistance value of resistor 25. Therefore, capacitor 22 decreases the voltage $V_C$ in a linear function fashion as shown in FIG. 4(D) below threshold voltage $V_{TH}$ of NOR gate 21 so that second input terminal of NOR gate 21 is lowered to low voltage level and further to zero volt upon discharge completion of capacitor 22 at point $t_3$. When a rated electric power not shown is applied to load, primary MOS-FET 4 is kept on for the long period and then turned off at point $t_4$ late after discharge completion point $t_3$ of capacitor 22. Operations after point $t_4$ are substantially similar to those in the switching power source of the first embodiment shown in FIG. 1.

When a light load not shown is connected to output terminals 7 and 8, primary MOS-FET 4 is operated with the shorter on-span than that during the rated load period to shorten the pulse width of voltage $V_A$ at junction A of reactor 11 and dividing resistor 19 as shown in FIG. 5(A). Accordingly, voltage $V_A$ at junction A of reactor 11 and dividing resistor 19 reaches zero volt at point $t_5$ early before discharge completion point $t_3$ of capacitor 22 as shown in FIG. 5(A) so that divided voltage of resistors 19 and 20 similarly decreases to low level at point $t_5$ to apply low level voltage to first input terminal of NOR gate 21. Also, during the on-period of primary MOS-FET 4 between points $t_2$ and $t_5$, junction between resistors 19 and 20 is kept at high voltage level, and second inverter 23 produces the output of low voltage level to discharge capacitor 22 by electric current flowing from capacitor 22 through resistor 25 and fourth diode 24 to second inverter 23 with the time constant determined by a product of capacitance of capacitor 22 and resistance value of resistor 25. Therefore, capacitor 22 decreases the voltage $V_C$ in a linear function fashion as shown in FIG. 5(D). When divided voltage at junction of resistors 19 and 20 comes to low level at point $t_5$, second inverter 23 produces the output of high voltage level to block current discharge from capacitor 22 through resistor 25 and fourth diode 24 to retain charged voltage $V_C$ in capacitor 22 at higher level than threshold voltage $V_{TH}$ of NOR gate 21. Therefore, as second input terminal of NOR gate 21 is kept at high voltage level during the light load period, NOR gate 21 keeps synchronous control signal $V_{SC}$ of low voltage level as shown in FIG. 5(C) to retain switch circuit 13 in inactive mode. Thus, secondary MOS-FET 9 is kept off during the light load period to bar the synchronous rectification operation by secondary MOS-FET 9, but only rectification is carried out through parasitic diode or external diode 9a.

In the second embodiment, primary MOS-FET 4 is turned on with drive signals $V_G$ of drive narrow pulse width $V_G$ during the light load period, and when voltage $V_A$ at junction A of reactor 11 and dividing resistor 19 drops to low level, retaining circuit 26 holds high voltage level at second input terminal of NOR gate 21 to maintain switch circuit 13 in inactive mode. This keeps the off-condition of secondary MOS-FET 9 to cease the synchronous rectification operation to minimize power loss in rectification circuit during the light load period.

Third Embodiment

Figure 6:
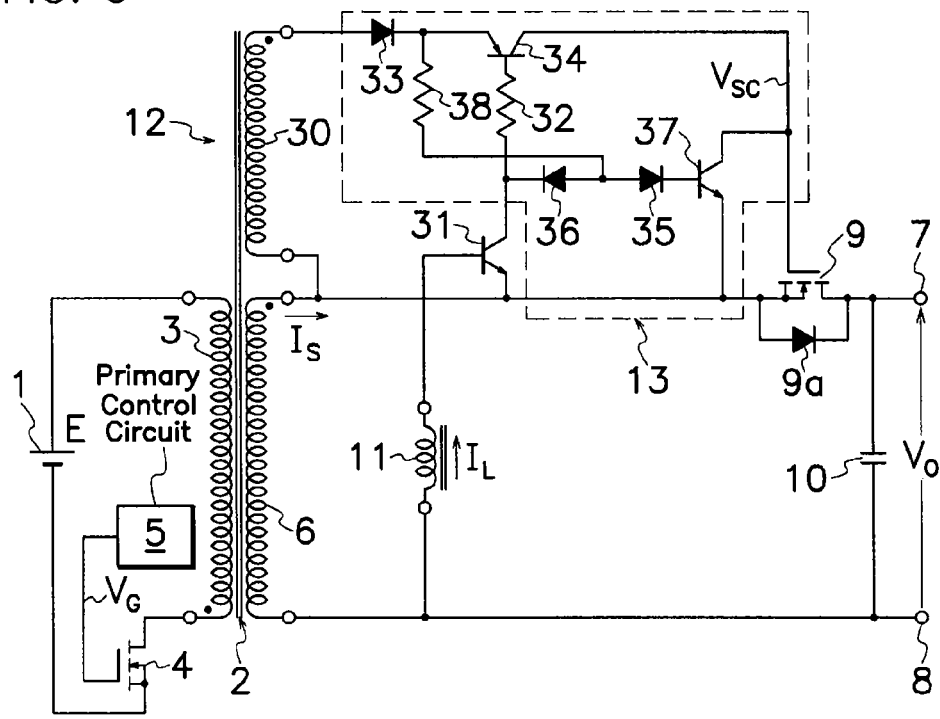
[FIG. 6] An electric circuit diagram showing another embodiment according to the present invention wherein a secondary control circuit comprises an exclusive OR gate (A Third Embodiment)

FIG. 6 shows a third embodiment of the switching power source device according to the present invention which comprises a secondary switching element or MOS-FET 9 of synchronous rectification connected between top end (marked black dot) of secondary winding 6 of transformer 2 and a positive output terminal 7; a tertiary winding 30 connected in series to secondary winding 6 of transformer 2; a first NPN transistor 31 as a reactor current detector; and a secondary control circuit 12 of synchronous rectification for controlling secondary MOS-FET 9. First NPN transistor 31 has a base terminal connected to one end of reactor 11; an emitter terminal connected to a junction of secondary and tertiary windings 6 and 30 of transformer 2; and a collector terminal connected to secondary control circuit 12 so that base terminal of first NPN transistor 31 detects electric current $I_L$ through reactor 11 to accumulate or discharge energy in reactor 11. Secondary control circuit 12 comprises a PNP transistor 34, a second NPN transistor 37 and a resistor 38 connected between anode terminals of two diodes 35 and 36 and a cathode terminal of a diode 33. PNP transistor 34 comprises a base terminal connected to collector terminal of first NPN transistor 31 through a resistor 32, an emitter terminal connected to top end (marked black dot) of tertiary winding 30 of transformer 2 through diode 33, and a collector terminal connected to a control or gate terminal of secondary MOS-FET 9. Second NPN transistor 37 has a base terminal connected to collector terminal of first NPN transistor 31 through two diodes 35 and 36 connected to each other in adverse polarity, an emitter terminal connected to a source terminal of secondary MOS-FET 9, and collector terminal connected to a gate terminal of secondary MOS-FET 9. Two resistors 32 and 38, three diodes 33, 35 and 36, PNP transistor 34 and second NPN transistor 37 are cooperated to form a switch circuit 13 which is connected to tertiary winding 30, reactor current detector 31 and gate terminal of secondary MOS-FET 9.

In the switching power source shown in FIG. 6, primary control circuit 5 produces drive signals $V_G$ of high voltage level to gate terminal of primary MOS-FET 4 to turn primary MOS-FET 4 on so that winding current flows from DC power source 1 through primary winding 3 of transformer 2 and primary MOS-FET 4 to accumulate energy in transformer 2. Here, assuming that E [V] denotes voltage of DC power source 1, and $L_P$ [H] is inductance of primary winding 3 of transformer 2, accumulated in transformer 2 during the on-period $t_{ON}$ [s] of primary MOS-FET 4 is energy expressed by the following:

$$(E^2/2L_P) \times t_{ON}^2 \quad [J]$$

At this time, no current $I_S$ flows through secondary winding 6 of transformer 2. Assuming that $N_P$ and $N_S$ indicate respectively number of turns in primary and secondary windings 3 and 6 of transformer 2, produced in secondary winding 6 whose top end (marked black dot) is negative (−) and bottom end is positive (+) is voltage $V_S$ expressed by the following:

$$V_S = (N_S/N_P) \times E \quad [V]$$

At this time, electric current $I_L$ flows through reactor 11 and base and emitter terminals of first NPN transistor 31 to accumulate energy in reactor 11. Here, if L [H] is inductance of reactor 11, electric current $I_L$ through reactor 11 increases in a linear function fashion at a rate of $V_S/L$ per second, and during the on-period $t_{ON}$ [s] of primary MOS-FET 4, accumulated in reactor 11 is energy shown by the following:

$$(V_S^2/2L) \times t_{ON}^2 \quad [J]$$

Also, electric current $I_L$ flows through base terminal of first NPN transistor 31 which therefore is turned on. In addition, tertiary winding 30 of transformer 2 produces associated voltage with the negative (−) side at top end (marked black dot) and positive (+) side at bottom end to maintain all of PNP transistor 34, second NPN transistor 37 and secondary MOS-FET 9 off.

Then, when primary control circuit 5 changes the output from high to low voltage level to gate terminal of primary MOS-FET 4 to switch primary MOS-FET 4 from on to off, voltage polarity changes to positive (+) top end (marked black dot) and negative (−) bottom end in secondary winding 6 of transformer 2 to produce voltage $V_S$ shown in the given formula:

$$V_S = (N_S/N_P) \times E \quad [V]$$

Concurrently, also, voltage arises with the positive (+) and negative (−) sides at respectively top (marked black dot) and bottom ends of tertiary winding 30. At this instant, electric current $I_L$ flows from reactor 11 through base and emitter terminals of first NPN transistor 31 to output terminals 7 and 8, discharging energy stored in reactor 11 to maintain first NPN transistor 31 on. Simultaneously, base terminal of PNP transistor 34 is lowered to low voltage level to cause conductive current to flow through base terminal of PNP transistor 34, resistor 32 and first NPN transistor 31, and therefore, PNP transistor 34 is turned on. In this case, cathode terminal of diode 35 comes to low voltage level to bar passage of electric current through base terminal of second NPN transistor 37 which is kept off. Under the circumstances, voltage produced in tertiary winding 30 of transformer 2, induces electric current which flows from tertiary winding 30 through diode 33 and PNP transistor 34 to apply voltage to gate terminal of secondary MOS-FET 9 which is turned on.

Accumulated in transformer 2 during the on-period $t_{ON}$ [s] of primary MOS-FET 4, is energy expressed by formula:

$$(E^2/2L_P) \times t_{ON}^2 \quad [J]$$

When secondary MOS-FET 9 is turned on, electric current flows from secondary winding 6 through secondary MOS-FET 9 to output terminals 7 and 8 discharging energy from transformer 2. Here, if $L_S$ [H] is inductance of secondary winding 6 of transformer 2, electric current $I_S$ from secondary winding 6 decreases in a linear function fashion at a rate of $V_O/L_S$ per second during the on-period of secondary MOS-FET 9 with reduction of energy in secondary winding 6 with the ramp:

$$(V_O^2/2L_S) \times t^2$$

Then, there is the following relation among inductances $L_P$ and $L_S$ [H] and numbers of turns $N_P$ and $N_S$ of primary and secondary windings 3 and 6 of transformer 2:

$$L_S = (N_S/N_P)^2 \times L_P$$

Therefore, discharge time $t_T$ for releasing energy accumulated in transformer 2 is shown by:

$$t_T = (N_S \cdot E/N_P \cdot V_O) \times t_{ON} \quad [s]$$

Simultaneously, accumulated in reactor 11 during the on-period $t_{ON}$ [s] of primary MOS-FET 4 is energy expressed by:

$$(V_S^2/2L) \times ON^2 \quad [J]$$

which is discharged by electric current $I_L$ flowing from reactor 11 through base and emitter terminals of first NPN transistor 31 while electric current $I_L$ decreases at a rate $V_O/L$ per second in a linear function fashion. During the on-period of secondary MOS-FET 9, energy in reactor 11 is reduced with the ramp:

$$(V_O^2/2L) \times t^2$$

Therefore, discharge time $t_L$ for releasing energy from reactor 11 is shown by the formula:

$$t_L = (N_S \cdot E/N_P \cdot V_O) \times t_{ON} \quad [s]$$

The discharge time $t_L$ is essentially equal to discharge time $t_T$ for releasing energy in transformer 2.

When release of whole energy in reactor 11 is completed, no discharge current $I_L$ flows from reactor 11 through base terminal of first NPN transistor 31 to turn first NPN transistor 31 off. This changes base terminal of PNP transistor 34 to high voltage level to turn PNP transistor 34 off. At the same time, cathode terminal of diode 35 comes to high voltage level to cause electric current to flow through base terminal of second NPN transistor 37 which is turned on. Accordingly, nearly zero volt voltage is applied to gate terminal of secondary MOS-FET 9 which is turned from on to off to finish the synchronous rectification operation.

In this way, the third embodiment of FIG. 6 retains secondary MOS-FET 9 off during the on-period of primary MOS-FET 4 to accumulate energy in tertiary winding 30 of transformer 2; during the off-period of primary MOS-FET 4 electric current $I_L$ flows from reactor 11 through base terminal of first NPN transistor 31; when NPN transistor 31 detects discharge current $I_L$, secondary MOS-FET 9 is turned on by voltage produced in tertiary winding 30; when electric current $I_L$ through base terminal of first NPN transistor 31 is exhausted and not detected, secondary MOS-FET 9 is turned off. In this case, first NPN transistor 31 and switch circuit 13 constitute a synchronous rectification controller 12. Other components are substantially similar to those in the first embodiment shown in FIG. 1.

Similarly to the first embodiment, the third embodiment also contemplates to turn secondary MOS-FET 9 on and off in response to the accumulation and discharge periods of energy in reactor 11 connected to base and emitter terminals of first NPN transistor 31 in parallel to secondary winding 6 of transformer 2 so that the period for synchronous rectification operation can be automatically adjusted according to fluctuation in original voltage E of DC power source 1 and DC output voltage $V_O$ between output terminals 7 and 8 to perform efficient synchronous rectification operation. Accordingly, the device can produce DC output voltage $V_O$ from secondary winding 6 of transformer 2 through secondary MOS-FET 9 and output smoothing capacitor 10 while controlling power loss in DC output voltage $V_O$ over wide input and output range. Also, secondary control circuit 12 can minimize power loss because whole energy saved in reactor 11 is transmitted to output terminals 7 and 8 through base and emitter terminals of first NPN transistor 31.

Fourth Embodiment

Figure 7:
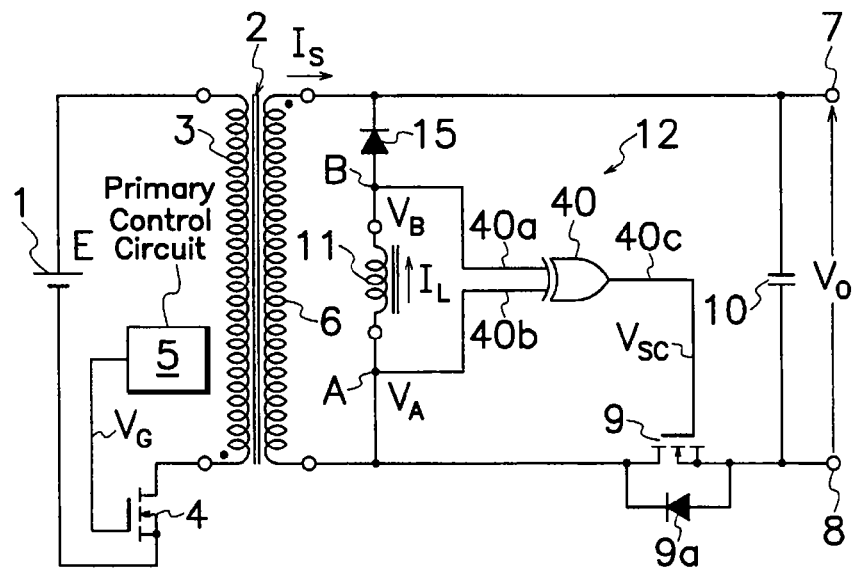
[FIG. 7] An electric circuit diagram showing a further varied embodiment according to the present invention (A Fourth Embodiment)
Figure 8:
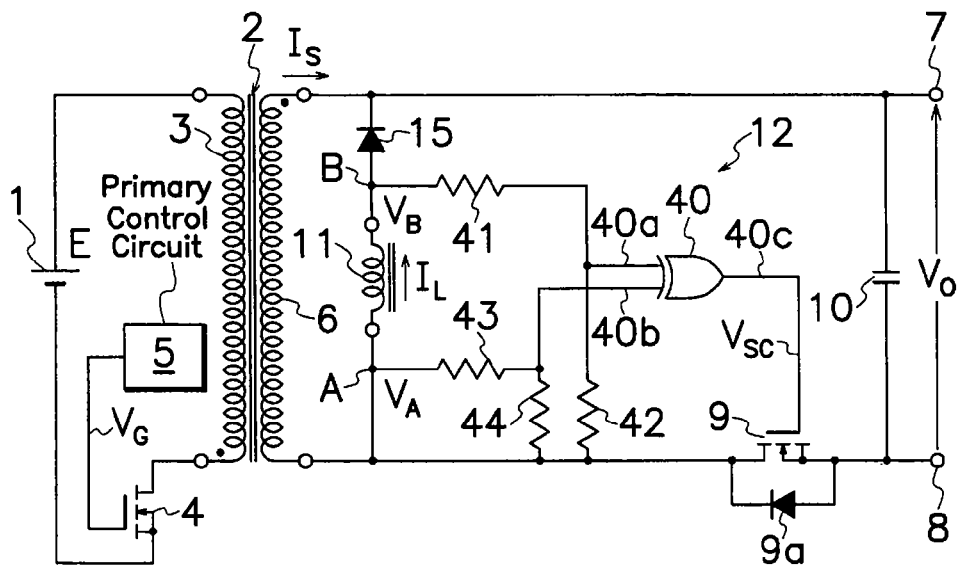
[FIG. 8] An electric circuit diagram showing a varied embodiment of FIG. 7.

The first embodiment of the switching power source device shown in FIG. 1 comprises secondary control circuit 12 which may include an exclusive OR gate 40 as shown in a fourth embodiment of FIG. 7. Exclusive OR gate 40 has a first input terminal 40a connected to a junction B of reactor 11 and first diode 15, a second input terminal 40b connected to a junction A of reactor 11 and drain terminal of secondary MOS-FET 9 and an output terminal 40c connected to gate terminal of secondary MOS-FET 9.

In the fourth embodiment shown in FIG. 7, during the on-period of primary MOS-FET 4, winding current flows through DC power source 1 through primary winding 3 of transformer 2 and primary MOS-FET 4 to accumulate energy in transformer 2. In this case, produced between negative (−) top end (marked black dot) and positive (+) bottom end of secondary winding 6 of transformer 2 is voltage $V_S$ expressed by the following:

$$V_S = (N_S/N_P) \times E \quad [V]$$

At this time, voltage $V_A$ at the other (bottom) end of reactor 11 is substantially equal to voltage $V_S$ produced in secondary winding 6 of transformer 2; voltage $V_B$ at one (top) end of reactor 11 is substantially equal to a sum $(V_O + V_F)$ of DC output voltage $V_O$ between output terminals 7 and 8 and forward voltage drop $V_F$ of first diode 15; and therefore, electric current $I_L$ flows into reactor 11 through first diode 15 to store energy in reactor 11. In this case, since high level voltages are applied to both first and second input terminals 40a and 40b, exclusive OR gate 40 produces synchronous control signal $V_{SC}$ of low voltage level to gate terminal of secondary MOS-FET 9 to retain secondary MOS-FET 9 off.

Then, when primary MOS-FET 4 is switched from on to off, voltage polarity changes to positive (+) top end (marked black dot) and negative (−) bottom end in secondary winding 6 of transformer 2 to produce voltage $V_S$ shown in the given formula:

$$V_S = (N_S/N_P) \times E \quad [V]$$

At this moment, voltage $V_A$ at the other end of reactor 11 drops to nearly zero volt voltage which is sent to second input terminal 40b of exclusive OR gate 40. On the other hand, voltage $V_B$ at one end of reactor 11 is substantially equal to a sum voltage $(V_O + V_F)$ of DC output voltage $V_O$ between output terminals 7 and 8 and forward voltage drop $V_F$ through first diode 15 to apply high level voltage to first input terminal 40a of exclusive OR gate 40. Accordingly, exclusive OR gate 40 changes synchronous control signal $V_{SC}$ from low to high voltage level to secondary MOS-FET 9 to turn secondary MOS-FET 9 on. This causes electric current $I_S$ to run from secondary winding 6 to output terminals 7 and 8, releasing energy stored in transformer 2 during the on-period of primary MOS-FET 4, while electric current $I_L$ flows from reactor 11 through first diode 15 to output terminals 7 and 8 releasing energy stored in reactor 11.

When energy release from reactor 11 is completed while no electric current $I_L$ flows from reactor 11, voltage $V_B$ at one end of reactor 11 rapidly drops from $(V_O + V_F \ [V])$ to approximately zero volt to apply low level voltage to first input terminal 40a of exclusive OR gate 40. Since voltage $V_A$ of approximately zero volt at the other end of reactor 11 is also given to second input terminal 40b of exclusive OR gate 40 to change synchronous control signal $V_{SC}$ of exclusive OR gate 40 from high to low voltage level to gate terminal of secondary MOS-FET 9 which therefore is turned from on to off to finish the synchronous rectification operation.

As above-mentioned, the fourth embodiment of FIG. 7 performs similar operations and functions and produces similar effects as those of the switching power source in the first embodiment shown in FIG. 1. In addition, the fourth embodiment comprises a single exclusive OR gate 40 for synchronous rectification control circuit 12 in an advantageously extremely simplified circuit structure compared to the circuit shown in the first embodiment.

Figure 9:
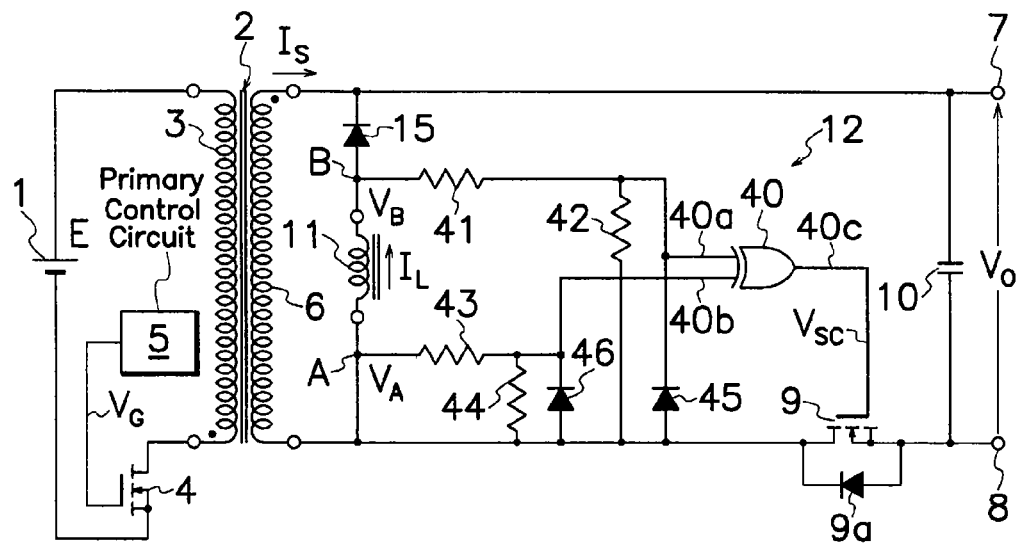
[FIG. 9] An electric circuit diagram showing a varied embodiment of FIG. 8.

Actually in major cases, voltages $V_B$ and $V_A$ at one and the other ends of reactor 11 cover the extent which exceeds the input voltage range for exclusive OR gate 40, and therefore, preferably first level shift resistors 41 and 42 are connected between one and the other ends of reactor 11 to connect a junction between first level shift resistors 41 and 42 to first input terminal 40a of exclusive OR gate 40, and second level shift resistors 43 and 44 are connected between one and the other ends of reactor 11 to connect a junction between second level shift resistors 43 and 44 to second input terminal 40b of exclusive OR gate 40. Moreover, as shown in FIG. 9, first and second clamp diodes 45 and 46 may be connected respectively between a junction of first level shift resistors 41 and 42 and the other end A of reactor 11 and between a junction of second level shift resistors 43 and 44 and the other end A of reactor 11 to clamp voltages $V_B$ and $V_A$ to zero volt when voltage $V_B$ or $V_A$ at one or the other end of reactor 11 is lowered to a negative (−) level.

Fifth Embodiment

Meanwhile, the fourth embodiment is described that voltage $V_A$ at the other end of reactor 11 becomes substantially zero volt upon completion of energy release from reactor 11, however, actually oscillation voltage appears at the other end of reactor 11 by ringing after completion of energy release from transformer 2. For that reason, sometimes voltage $V_A$ at the other end of reactor 11 is not lowered below threshold voltage of exclusive OR gate 40 to disadvantageously apply high level voltage to second input terminal 40b of exclusive OR gate 40. In this case, upon completion of energy release from reactor 11, exclusive OR gate 40 unfavorably produces synchronous control signal $V_{SC}$ of high voltage level from output terminal 40c to gate terminal of secondary MOS-FET 9 which can not correctly be turned from on to off. In this view, the fifth embodiment of the switching power source shown in FIG. 10 comprises an AND gate 50 and an inverter 51 for synchronous rectification circuit 12 in lieu of exclusive OR gate 40. Specifically, first input terminal 50a of AND gate 50 is connected to junction B of reactor 11 and first diode 15, second input terminal 50b of AND gate 50 is connected through inverter 51 to junction A of reactor 11 and drain terminal of secondary MOS-FET 9, and output terminal 50c of AND gate 50 is connected to gate terminal of secondary MOS-FET 9.

Figure 10:
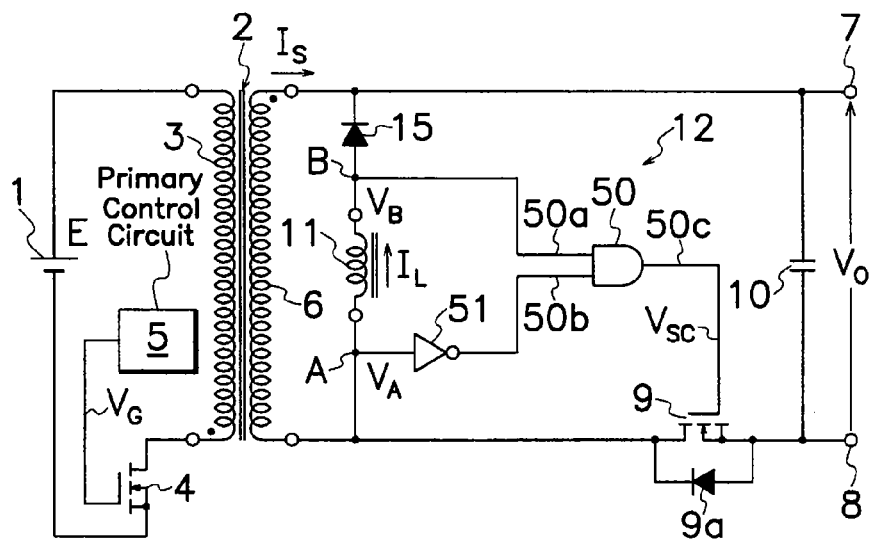
[FIG. 10] An electric circuit diagram showing an embodiment of the secondary control circuit which comprises an AND gate and an inverter (A Fifth Embodiment)

In the switching power source device shown in FIG. 10, when primary MOS-FET 4 is turned on, winding current flows from DC power source 1 through primary winding 3 of transformer 2 and primary MOS-FET 4 to accumulate energy in transformer 2. In this case, secondary winding 6 of transformer 2 produces voltage $V_S$: $V_S=(N_S/N_P) \times E$ [V] with negative (−) top end (marked black dot) and positive (+) bottom end so that voltage $V_A$ at the other end of reactor 11 is substantially equal to voltage $V_S$ produced in secondary winding 6 of transformer 2, and voltage $V_B$ at one end of reactor 11 is approximately equal to a sum voltage $(V_O+V_F)$ of output voltage between output terminals 7 and 8 and forward voltage drop $V_F$ of first diode 15. Under the circumstances, electric current $I_L$ flows through reactor 11 and first diode 15 to accumulate energy in reactor 11. At this moment, high level voltage is applied to first input terminal 50a of AND gate 50, and inverter 50 applies low level voltage to second input terminal of AND gate 50 so that AND gate 50 produces synchronous control signal $V_{SC}$ of low voltage level to gate terminal of secondary MOS-FET 9 which is kept off.

Then, when primary MOS-FET 4 is turned from on to off, voltage polarity in secondary winding 6 of transformer 2 to positive (+) top end (marked black dot) and negative (−) bottom end to produce voltage $V_S$ shown in the given formula:

$$V_S=(N_S/N_P) \times E \quad [V]$$

At this moment, as voltage $V_A$ at the other end of reactor 11 falls to substantially zero volt, inverter 51 gives high level voltage to second input terminal 50b of AND gate 50. Meanwhile, because voltage $V_B$ at one end of reactor 11 is substantially equal to a sum voltage $(V_O+V_F)$ of DC output voltage $V_O$ between output terminals 7 and 8 and forward voltage drop $V_F$ of first diode 15, high level voltage is furnished to first input terminal 50a of AND gate 50. Accordingly, AND gate 50 changes synchronous control signal $V_{SC}$ at output terminal 50c from low to high voltage level to secondary MOS-FET 9 which is then turned from off to on. This causes electric current $I_S$ to flow from secondary winding 6 to output terminals 7 and 8, discharging energy accumulated in transformer 2 during the on-period of primary MOS-FET 4, and at the same time, electric current $I_L$ flows from reactor 11 through first diode 15 to output terminals 7 and 8 releasing energy stored in reactor 11.

Upon completion of energy release from reactor 11 with no electric current $I_L$ from reactor 11, voltage $V_B$ at one end of reactor 11 promptly drops from the level $(V_O+V_F$ [V]) to nearly zero volt to apply low level voltage to first input terminal of AND gate 50. Whether low or high level voltage is applied to second input terminal 50b of AND gate 50 from the other end of reactor 11 through inverter 51, AND gate 50 changes synchronous control signal $V_{SC}$ at output terminal 50c from high to low voltage level to gate terminal of secondary MOS-FET 9 which is turned from on to off to finish the synchronous rectification operation.

In the fifth embodiment, even in case oscillation voltage of large amplitude appears by ringing at the other end of reactor 11 after completion of energy release from reactor 11, benefit can be gained to enable secondary MOS-FET 9 to exactly be switched from on to off.

Figure 11:
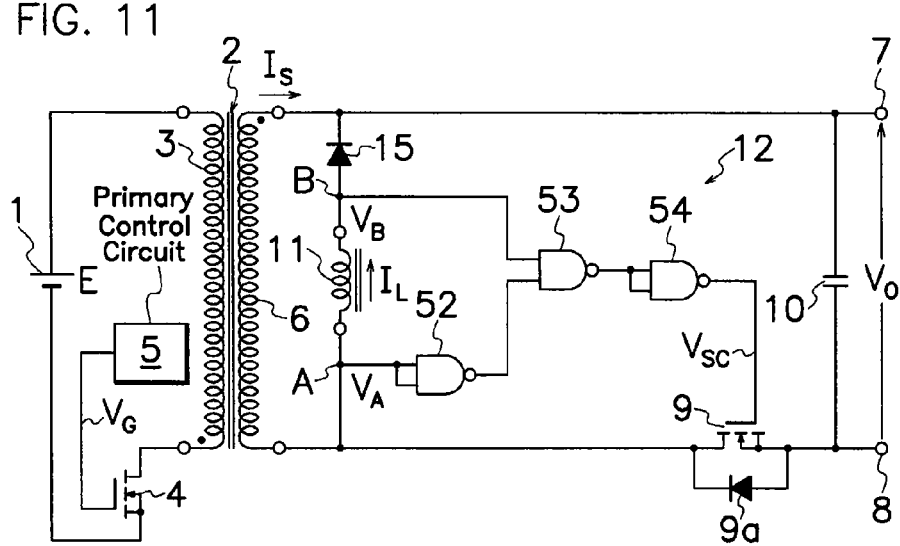
[FIG. 11] An electric circuit diagram showing an embodiment of a secondary control circuit which comprises three NAND gates.

In view of cost in manufacture, it is beneficial to compose AND gate 50 and inverter 51 of a kind of logical elements for synchronous rectification controller 12 in the fifth embodiment, and therefore, synchronous rectification controller 12 preferably comprises first to third NAND gates 52, 53 and 54 as shown in FIG. 11. Specifically, as shown, first and second NAND gates 52 and 53 are connected in place of inverter 51 and AND gate 50 shown in FIG. 10, and also third NAND gate 54 is connected to a later stage of second NAND gate 53 to make an equivalent synchronous rectification controller 12 to that shown in FIG. 10.

Sixth Embodiment

Figure 12:
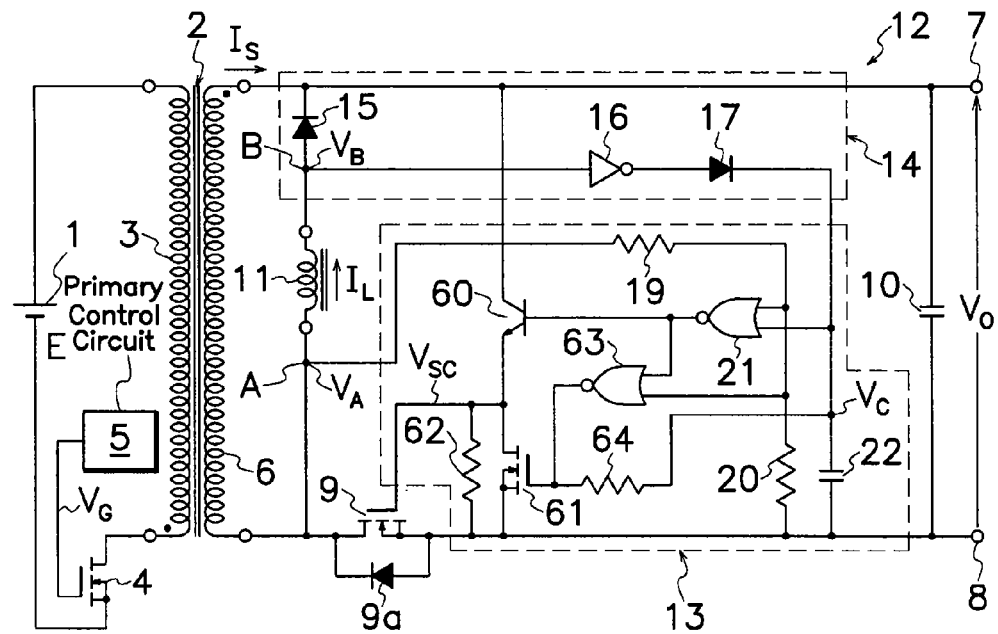
[FIG. 12] An electric circuit diagram showing a still further modified embodiment of the present invention (A Sixth Embodiment).

FIG. 12 illustrates a modified fifth embodiment of the switching power source which comprises drive NPN transistor 60 and MOS-FET 61 connected in series between cathode terminal of first diode 15 and source terminal of secondary MOS-FET 9. Gate terminal of secondary MOS-FET 9 is connected to a junction between emitter terminal of drive NPN transistor 60 and drain terminal of drive MOS-FET 61, and a first resistor 62 is connected between gate and source terminals of secondary MOS-FET 9. Output terminal of first NOR gate 21 is connected to base terminal of drive NPN transistor 60 and first input terminal of second NOR gate 63. A junction between dividing resistors 19 and 20 is connected to second input terminal of second NOR gate 63 whose output terminal is connected to gate terminal of drive MOS-FET 61. A second resistor 64 is connected between a junction of cathode terminal of second diode 17 and capacitor 22, and gate terminal of drive MOS-FET 61 to form switch circuit 13 in cooperation with dividing resistors 19 and 20 and first NOR gate 21, but third and fourth diodes 18 and 24 and second inverter 23 shown in FIG. 1 are omitted from FIG. 12. Other components shown in FIG. 12 are substantially similar to those in the switching power source shown in FIG. 1.

In the switching power source device shown in FIG. 12, during the on-period of primary MOS-FET 4, winding current flows from DC power source 1 through primary winding 3 of transformer 2 and primary MOS-FET 4 to accumulate energy in transformer 2. In this case, no electric current flows through secondary winding 6, instead, assuming that E is the original voltage of DC power source 1, $N_P$ and $N_S$ are respectively number of turns in primary and secondary windings 3 and 6 of transformer 2, produced in secondary winding 6 whose top end (marked black dot) is negative (−) and bottom end is positive (+) is voltage $V_S$ expressed by the following:

$$V_S=(N_S/N_P) \times E \quad [V]$$

At this time, voltage $V_A$ at junction A between reactor 11 and dividing resistor 19 is substantially equal to voltage $V_S$ produced in secondary winding 6 of transformer 2; voltage $V_B$ at junction B between reactor 11 and first diode 15 is substantially equal to a sum $(V_O+V_F)$ of DC output voltage $V_O$ between output terminals 7 and 8 and forward voltage drop $V_F$ of first diode 15; and therefore, electric current $I_L$ flows into reactor 11 through first diode 15 to accumulate energy in reactor 11.

On the other hand, produced between drain and source terminals of secondary MOS-FET 9 are voltage $V_S$ expressed by the formula:

$$V_S=(N_S/N_P) \times E \quad [V]$$

plus DC output voltage $V_O$ between output terminals 7 and 8, total amount to:

$$V_S+V_O$$

This sum voltage ($V_S+V_O$) is split by dividing resistors 19 and 20 in switch circuit 13 which constitutes secondary control circuit 12 for synchronous rectification to apply voltage at junction of dividing resistors 19 and 20 to first input terminal of first NOR gate 21. Accordingly, when primary MOS-FET 4 is turned on, produced at junction of dividing resistors 19 and 20 is of high level voltage to make first NOR gate 21 generate the output of low voltage level to keep drive NPN transistor 60 off. High level voltage at junction of dividing resistors 19 and 20 also is applied to second input terminal of second NOR gate 63 which produces the output of low voltage level to keep drive MOS-FET 61 off. Accordingly, no synchronous control signal $V_{SC}$ is produced to gate terminal of secondary MOS-FET 9 from junction of emitter terminal of drive NPN transistor 60 and drain terminal of drive MOS-FET 61, and first resistor 62 retains gate terminal of secondary MOS-FET 9 in low voltage level to maintain switch circuit 13 in inactive mode and secondary MOS-FET 9 off. At this time, high level voltage is applied to first inverter 16 in reset detection circuit 14 of synchronous rectification controller 12 from junction B of reactor 11 and first diode 15, and first inverter 16 produces the output of low voltage level to keep voltage $V_C$ in capacitor 22 in low voltage level.

Then, when primary MOS-FET 4 is turned from on to off, voltage polarity in secondary winding 6 of transformer 2 changes to positive (+) top end (marked black dot) and negative (−) bottom end to produce voltage $V_S$ shown in the given formula:

$$V_S=(N_S/N_P)\times E \quad [V]$$

At this moment, as voltage $V_A$ at junction A of reactor 11 and dividing resistor 19 falls to substantially zero volt, divided voltage between dividing resistors 19 and 20 becomes low, and therefore, first NOR gate 21 receives low level voltage at first input terminal. At this moment, because voltage $V_B$ at junction of reactor 11 and first diode 15 is substantially equal to a sum voltage ($V_O+V_F$) of DC output voltage $V_O$ between output terminals 7 and 8 and forward voltage drop $V_F$ of first diode 15, high level voltage is furnished to first inverter 16 in reset detecting circuit 14 to make output from first inverter 16 at low voltage level. Also, second NOR gate 63 produces the output of low voltage level to keep charged voltage $V_C$ in capacitor 22 at low voltage level through second resistor 64 so that low level voltage is applied to second input terminal of first NOR gate 21. Accordingly, first NOR gate 21 produces the output of high voltage level to turn drive PNP transistor 60 on to keep emitter terminal of PNP transistor 60 in high voltage level. First NOR gate 21 produces the output of high level voltage to first input terminal of second NOR gate 63 which produces the output of low voltage level to gate terminal of drive MOS-FET 61 which is kept off. In this way, as drive NPN transistor 60 is on, and drive MOS-FET 61 is off, synchronous control signal $V_{SC}$ of high voltage level is applied from emitter terminal of drive NPN transistor 60 to gate terminal of secondary MOS-FET 9, thereby switch circuit 13 is switched from inactive to active mode. Accordingly, secondary MOS-FET 9 is turned on to cause electric current $I_S$ to flow from secondary winding 6 of transformer 2 to output terminals 7 and 8, releasing energy accumulated in secondary winding 6 of transformer 2 during the on-period of primary MOS-FET 4, and electric current $I_S$ decreases in a linear function fashion. Simultaneously, electric current $I_L$ flows from reactor 11 through first diode 15, releasing energy accumulated in reactor 11 during the on-period of primary MOS-FET 4, and electric current $I_L$ decreases in a linear function fashion.

When electric current $I_L$ from reactor 11 decreases to essentially zero volt upon completion of whole energy discharge from reactor 11, reset voltage $V_B$ at junction B of reactor 11 and first diode 15 rapidly drops from ($V_O+V_F$ [V]) to low level voltage which is applied to first inverter 16 in reset detecting circuit 14 so that first inverter 16 produces the output of high voltage level to capacitor 22 through second diode 17. Accordingly, electric current flows from first inverter 16 through second diode 17 to charge capacitor 22 which supplies high voltage level to second input terminal of first NOR gate 21 in switch circuit 13. Accordingly, first NOR gate 21 produces the output of low voltage level to base terminal of drive NPN transistor 60 which is then turned off. On the other hand, voltage $V_A$ at junction A of reactor 11 and dividing resistor 19 is of approximately zero volt to apply low level voltage through junction of dividing resistors 19 and 20 to second input terminal of second NOR gate 63. Also, as first NOR gate 21 produces the output of low voltage level to first input terminal of second NOR gate 63, second NOR gate 63 produces the output of high voltage level to gate terminal of drive MOS-FET 61 which is turned on. Accordingly, switch circuit 13 comes to the situation that drive NPN transistor 60 is off, and drive MOS-FET 61 is on to provide synchronous control signal $V_{SC}$ of low voltage level to gate terminal of secondary MOS-FET 9 from junction between emitter terminal of drive NPN transistor 60 and drain terminal of drive MOS-FET 61, shifting switch circuit 13 from active to shift mode so that secondary MOS-FET 9 is turned off to finish the synchronous rectification operation. At this time, high voltage level is also applied from output terminal of second NOR gate 63 through second resistor 64 to capacitor 22 which therefore maintains the voltage $V_C$ of high level until primary MOS-FET 4 is again turned off. Repeatedly, oscillation voltage occurs by ringing at junction A between reactor 11 and dividing resistor 19 during the period from the turning-off of secondary MOS-FET 9 to the next turning-on of primary MOS-FET 4.

By the way, in case voltage $V_A$ at the other end of reactor 11 does not drop below threshold voltage of second NOR gate 63 while oscillation voltage occurs by ringing at the other end of reactor 11 after completion of energy release from transformer 2, high voltage level is applied to second input terminal of second NOR gate 63 which produces the output of low voltage level to gate terminal of drive MOS-FET 61 to turn drive MOS-FET 61 off. Under the coincidental off condition of both drive NPN transistor 60 and MOS-FET 61, no synchronous control signal $V_{SC}$ is given from junction of drive NPN transistor 60 and MOS-FET 61 to gate terminal of secondary MOS-FET 9 which is exactly retained in low voltage level through first resistor 62 to change switch circuit 13 from active to shift mode. Therefore, after completion of energy release from transformer 2, secondary MOS-FET 9 is turned off to finish the synchronous rectification operation even though voltage $V_A$ at the other end of reactor 11 does not drop below threshold voltage of second NOR gate 63.

In the sixth embodiment, during the on-period of primary MOS-FET 4 to accumulate energy in transformer 2 and reactor 11, drive NPN transistor 60 and drive MOS-FET 61 are coincidentally turned off, while keeping secondary MOS-FET 9 off through first resistor 62 connected between gate and source terminals of secondary MOS-FET 9. Therefore, there is no need for successively applying synchronous control signal $V_{SC}$ of low voltage level to gate terminal of secondary MOS-FET 9 during the off-period thereof, restraining power consumption in synchronous rectification controller 12.

Embodiments of the present invention can be modified in various ways without limitation to the foregoing first to sixth embodiments. For example, first, second, fourth to sixth embodiments indicate secondary MOS-FET 9 connected between bottom end of secondary winding 6 of transformer 2 and negative output terminal 8, but otherwise, secondary MOS-FET 9 may be connected between top end (marked black dot) of secondary winding 6 and positive output terminal 7 as in the third embodiment of FIG. 6. Also, first and second inverters 16 and 23 of first and second embodiments may comprise or be composed of logical elements similar to NOR gate 18. In other words, NOR gates can be used as inverters if one of input terminals of NOR gates is grounded. Third diode 18 for clamping zero volt shown in FIGS. 1 and 3 may be connected between negative output terminal 8 and junction of first diode 15 and first inverter 16 in the sixth embodiment shown in FIG. 12. First to sixth embodiments employ secondary MOS-FET (MOS Field Effect Transistor) 9 as a secondary switching element which has a parasitic diode between drain and source terminals, but instead, secondary switching element may comprise or be composed of IGBT (Insulated Gate Bipolar Transistor), SIT (Static Induction Transistor) or PNP or NPN bipolar transistor all of which do not contain a built-in parasitic diode, and therefore, alternatively a separate external rectifying diode can be connected to main terminals of secondary switching element.

INDUSTRIAL APPLICABILITY

The present invention is effectively applicable to synchronous rectification switching power source devices of flyback type.

What is claimed is:

1. A switching power source device comprising:
    a primary winding of a transformer and a primary switching element connected in series to a DC power source wherein said primary switching element is turned on and off to cause electric current to flow through said primary winding and primary switching element in order to generate DC power from output terminals connected to a secondary winding of said transformer;
    a secondary switching element for synchronous rectification connected between said secondary winding of said transformer and output terminals,
    a reactor connected in parallel to said secondary winding of the transformer for accumulating energy during the on-period of said primary switching element, and
    a secondary control circuit connected to said reactor and a control terminal of said secondary switching element,
    wherein said secondary control circuit serves to retain said secondary switching element off during the period for accumulating energy in reactor, retain said secondary switching element on during the period for discharging energy accumulated in said reactor, and turn said secondary switching element off upon completion of energy release from said reactor.

2. The switching power source device of claim 1, wherein said secondary control circuit comprises a switch circuit which is switched to an inactive mode for keeping said secondary switching element off to accumulate energy in said reactor during the on-period of said primary switching element; an active mode for turning said secondary switching element on to release energy stored in said reactor during the off-period of said primary switching element; and a shift mode for turning said secondary switching element off upon completion of energy release from said reactor, and
    a reset detecting circuit for picking out resetting of said reactor upon completion of energy release from said reactor to convert said switch circuit from the active to the inactive mode to turn said secondary switching element off.

3. The switching power source device of claim 2, wherein said reset detecting circuit comprises a rectification element connected between one end of said secondary winding and one end of said reactor, and
    a reset voltage detector for detecting drop in reset voltage on a junction between said reactor and rectification element upon completion of energy release from said reactor to convert said switch circuit to the shift mode.

4. The switching power source device of claim 3, wherein said switch circuit comprises a switch controller which has a first input terminal connected to the other end of said reactor for detecting an accumulative period for accumulating energy in said reactor, a second input terminal connected to said reset detecting circuit, and an output terminal connected to a gate terminal of said secondary switching element.

5. The switching power source device of claim 4, further comprising a retaining circuit connected between the other end of said reactor and the second input terminal of said switch controller for maintaining the second input terminal of said switch controller at high voltage level to hold said switch circuit in the inactive mode when voltage of narrow pulse width is produced at the other end of said reactor.

6. The switching power source device of claim 1 or 2, wherein said secondary control circuit comprises a tertiary winding of said transformer, a reactor current detector connected to said reactor for detecting electric current for accumulating or discharging energy in said reactor, and a switch circuit connected to said tertiary winding, reactor current detector and control terminal of said secondary switching element,
    energy is accumulated in said tertiary winding at the same time energy is accumulated in said secondary winding and reactor,
    said switch circuit maintains said secondary switching element off to accumulate energy in said tertiary winding, turns said secondary switching element on by voltage produced in said tertiary winding when said reactor current detector detects electric current for releasing energy accumulated in said reactor, and turns said secondary switching element off once said reactor current detector has not detected the electric current from said reactor.

* * * * *